Sept 10, 1957     H. E. WARREN     2,805,903
VIBRATION AND WEAR REDUCING BEARING STRUCTURE
Filed Nov. 30, 1954
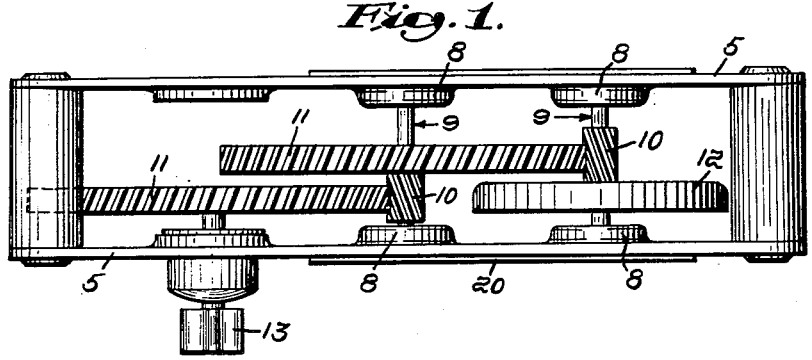
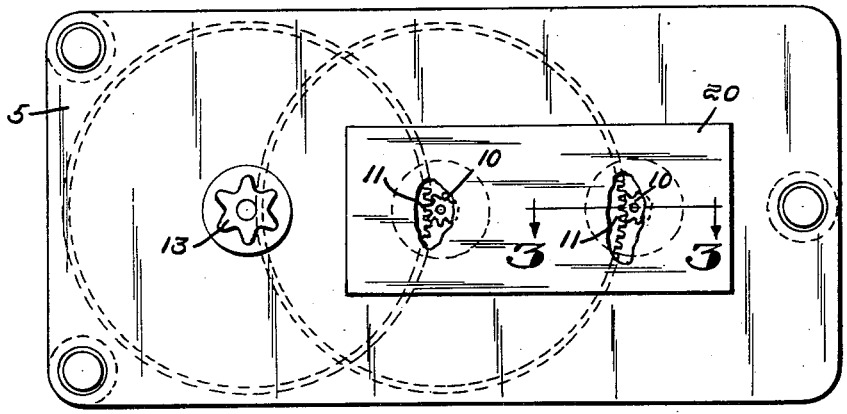
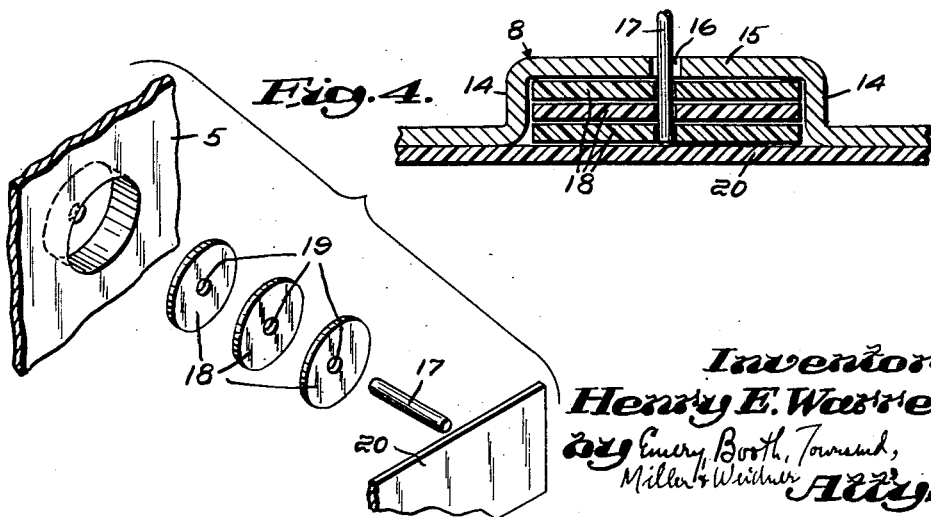
Inventor:
Henry E. Warren,
by Emery, Booth, Townsend,
Miller & Widner Attys 2,805,903
Patented Sept. 10, 1957

2,805,903

VIBRATION AND WEAR REDUCING BEARING STRUCTURE

Henry E. Warren, Ashland, Mass.

Application November 30, 1954, Serial No. 471,959

4 Claims. (Cl. 308—36)

This invention relates generally to shaft bearings and more particularly to bearings such as adapted for use with small high speed shafts and commonly requiring lubrication. The invention aims to provide a new and improved shaft bearing of the type described and characterized by the reduction and substantial elimination of the troublesome vibration and noise and also the excessive wear heretofore attendant upon the operation of such devices. The invention has for its further object the provision of a shaft bearing of simple design and durable construction and minimizing vibration and wear without the use of any lubricant.

My invention has many and varied applications, including particularly that to small, high speed gear reduction units such as found in an electric clock train, as herein selected for its exemplary illustration. The normal operation of electric clocks is of course continuous, and thus commonly comprehends periods, if not a place, of relative or absolute quiet. Audible sounds emanating from, or more particularly detectable vibrations in the gear trains of these clocks are therefore regarded as objectionable and to be eliminated. The shaft vibrations are of course transmitted to and many times magnified by the bearing and the clock casing structure integral therewith, whereby highly disturbing noise may be generated.

This undesired vibration and noise is the frequent result of the drying out of the conventional shaft bearings upon which the invention improves, and whose normal operation will thus be understood to require lubrication. These prior shaft bearings may generally be characterized further as rigid, hence as inducing or permitting vibration of their shafts in a definite or particular plane. Such fixed as opposed to random shaft vibration tends to concentrate the shaft-bearing contacts at one or two bearing points at which disproportionate wear develops, whence the bearing is rendered non-cylindrical, and the tendency to such fixed, wear-hastening vibration is increased.

The prior or conventional shaft bearings from which the present invention departs may thus and generally be described as having a rigid construction whereby they are subject to undesired friction, vibration, and noise, particularly upon the exhaustion or loss of their vibration-and-noise-damping oil or the like lubricant, which their satisfactory operation is known to require. Those skilled in the art will appreciate moreover that even the most perfectly concentric and balanced of these conventional structures are subject to the described tendency to vibration and wear due to the magnetic forces present and operative in the bearing unit.

Various means and methods have been proposed heretofore for perfecting and guaranteeing the lubrication of the conventional shaft bearings above described. In accordance with the present invention, however, there is provided a bearing permitting and promoting the quiet, or more particularly vibration-and-noise free operation of shafts such as here concerned, and at speeds ranging up to several thousand revolutions per minute, without the necessity for or use of any lubricants whatever. The improved shaft bearing of the invention is distinguished more particularly in that it is non-rigid, and provides a loose coupling of the shaft to the bearing frame. The invention bearing will be seen to be characterized still further and resultantly by a lack of reaction to vibration in any particular plane, whereby the mentioned tendency to vibration in a definite pattern is eliminated.

The invention will be better understood from a consideration of the following specification taken in conjunction with accompanying drawing in which:

Figs. 1 and 2 are top and side views of a representative electric clock gear train assembly;

Fig. 3 is a larger scale view, partly in section, of one of the shaft bearings of Fig. 1, and Fig. 4 is an exploded view thereof.

Referring now more particularly to Figs. 1 and 2 the gear train assembly there shown comprises a pair of rigid, parallel supporting plates 5 mounting integral shaft bearings or housings which are seen as formed cups 8, Fig. 1. The plates 5, and more particularly the cup shaped bearings 8 support a set or series of shafts 9 which may mount pinions 10 and which may be coupled or connected through reduction gears 11. The rotor 12 and spur gear 13 also there shown merely identify and distinguish further the driving and driven elements respectively of a conventional electric clock train mechanism.

The novel shaft bearing means of the invention is seen more particularly and from Figs. 3 and 4 to comprise an integral annular recess or well pressed or dished out of the plate 5 and presenting an annular side wall or flange 14 and a right angularly extensive or flattened end wall 15 capping or closing the same. The bearing end wall 15 is seen to be formed with a central aperture or opening 16 which is predeterminately oversized, as shown, and through which the shaft end 17 is received, or more particularly loosely fitted.

In accordance with the invention one or more, herein three annular, centrally apertured plates, washers or discs 18 are received in the recess 14, 15 and over the shaft end 17. These discs are seen to be formed similarly as the plate portion 15 with oversize openings, as at 19, Fig. 4, in which the shaft end 17 also has an easy running fit. As will shortly appear, the bearing elements 18 are constructed and arranged for random or floating and frictional engagement with both the recess 14, 15 and the shaft end 17, and are thus fashioned preferably of nylon or the like material which will not, even when dry, abrade metal as commonly employed for the latter elements.

Pursuant further to the invention the improved design of the shaft bearing 8 will be understood novelly and importantly to preclude reaction to vibration in a particular plane or direction, whereby the mentioned undesired tendency to fixed or patterned and noise-generating vibration of the shaft 17 is eliminated. More particularly, the arrangement and proportioning of the parts, and still more particularly the radial clearances between the shaft 17 and the end wall 15, the shaft and the discs 18, and the discs and side wall 14 are predeterminately such as to preclude engagement of the shaft with the bearing frame, yet permit and induce limited random or omni-directional lateral movement of the shaft. In other words, the total combined clearance between the shaft and discs and discs and recess is less than that between the shaft and the recess, that is, at the end wall 15 thereof. Thus the shaft weight or support is carried by and through the discs 18 only, which discs are seen to have only random, intermittent contact or engagement with the associated bearing elements 14, 17. Those skilled in the art will readily appreciate that the discs 18 thus have a tendency to revolve slowly within the bearing recesses, so that the described frictional contact, and more generally the bearing wear is distributed uniformly over the inner surface of the recess, whereby its circular form is preserved or maintained and the bearing life is greatly prolonged. It may be noted further that the bearing plates 18 may revolve in the same or in the opposite direction as the shaft, as dependent upon the mentioned random engagement of the same with the bearing; or more particularly the recess side wall 14.

The shaft bearing of the invention comprises still further a thin sheet of bearing material 20 joined or rigidly fixed to bearing plate 5 so as to overlie and seal the recess 14, 15. The sealing or cover plate 20 will be seen to prevent the entrance of undesired dust or dirt into the bearing. Further, the arrangement and proportioning of the parts is here such as to provide a small gap or clearance between the shaft end 16 and cover plate 20, as for desired limited freedom of axial movement or end play of the shaft in the bearing.

I have found that with the new and improved anti-vibration and wear shaft bearing as herein shown and described shaft speeds ranging to and on the order of 3000 R. P. M. or more can be maintained indefinitely without the use of any lubricant and that the operation of the bearing at all and including such high speeds is attended by no objectionable noise, and no appreciable wear. Certain manufacturing advantages will also be understood to derive from the present construction. Those skilled in the art will appreciate, for example, that accurate spacing of or fixing of center distances between the shaft bearings is more easily achieved with the recessed or pressed out bearing of the invention.

From the foregoing it will be appreciated that my present invention provides an improved shaft bearing which is of novel non-rigid construction, which requires no lubrication, and whose operation is uniquely characterized by reduction and substantial elimination of vibration and wear. My novel shaft bearing is thus distinguished further and finally by quiet operation and long life.

My invention is not limited to the particular embodiments thereof illustrated and described herein, and I set forth its scope in my following claims:

I claim:

1. An anti-vibration bearing for a rotary shaft having an end comprising a mounting plate, an annular housing supported by said plate, said housing formed centrally with an opening, a shaft having one end extending through said opening and into the housing into abuttive end relation with said mounting plate, said opening and said shaft end relatively proportioned for loose reception of the shaft in the opening, and one or more centrally apertured disc members loosely fitting in said housing and loosely received over said shaft end, the combined shaft end to disc and disc to housing clearance being less than that between the shaft end and housing opening, whereby vibration inducing engagement of the shaft end directly with the housing is prevented, and vibration stilling contact of the shaft end with the movable discs is permitted.

2. An anti-vibration bearing according to claim 1 wherein the material employed for said disc members is nylon.

3. An anti-vibration bearing for a rotary shaft having an end comprising a mounting plate, an annular dished portion on said plate, said dished portion formed centrally with an opening, a cover plate overlying said mounting plate at and sealing said annular dished portion, a shaft having one end extending through said dished portion opening and into abuttive end relation with said cover plate, said opening and shaft end relatively proportioned for loose fitting of the shaft in the opening, and a plurality of centrally apertured discs loosely fitted in said dished portion and over said shaft end, the clearance between said shaft end and said discs and between said discs and said dished portion being such that engagement of said shaft directly with said dished portion opening is prevented.

4. An anti-vibration bearing comprising a mounting plate, an annular dished portion on said plate, said dished portion formed centrally with an opening, means associated with said mounting plate and overlying and sealing said dished portion, a shaft having one end extending through said dished portion opening and into abuttive end relation with said dished portion overlying and sealing means, and a plurality of centrally apertured discs loosely fitted in said dished plate portion and over the shaft end, the radial clearance between said shaft end and opening exceeding the combined clearances between said shaft end and discs and said discs and dished portion, whereby random omni-directional lateral movement is permitted to and induced in said shaft.

References Cited in the file of this patent

UNITED STATES PATENTS

| 25,921 | Stone | Oct. 25, 1859 |
|---|---|---|
| 1,905,443 | Cope et al. | Apr. 25, 1923 |
| 2,491,558 | Hanson | Dec. 20, 1949 |
| 2,494,023 | Williams | Jan. 10, 1950 |
| 2,615,069 | Gallagher | Oct. 21, 1952 |

FOREIGN PATENTS

| 524,263 | Great Britain | Aug. 2, 1940 |